Figure 1:
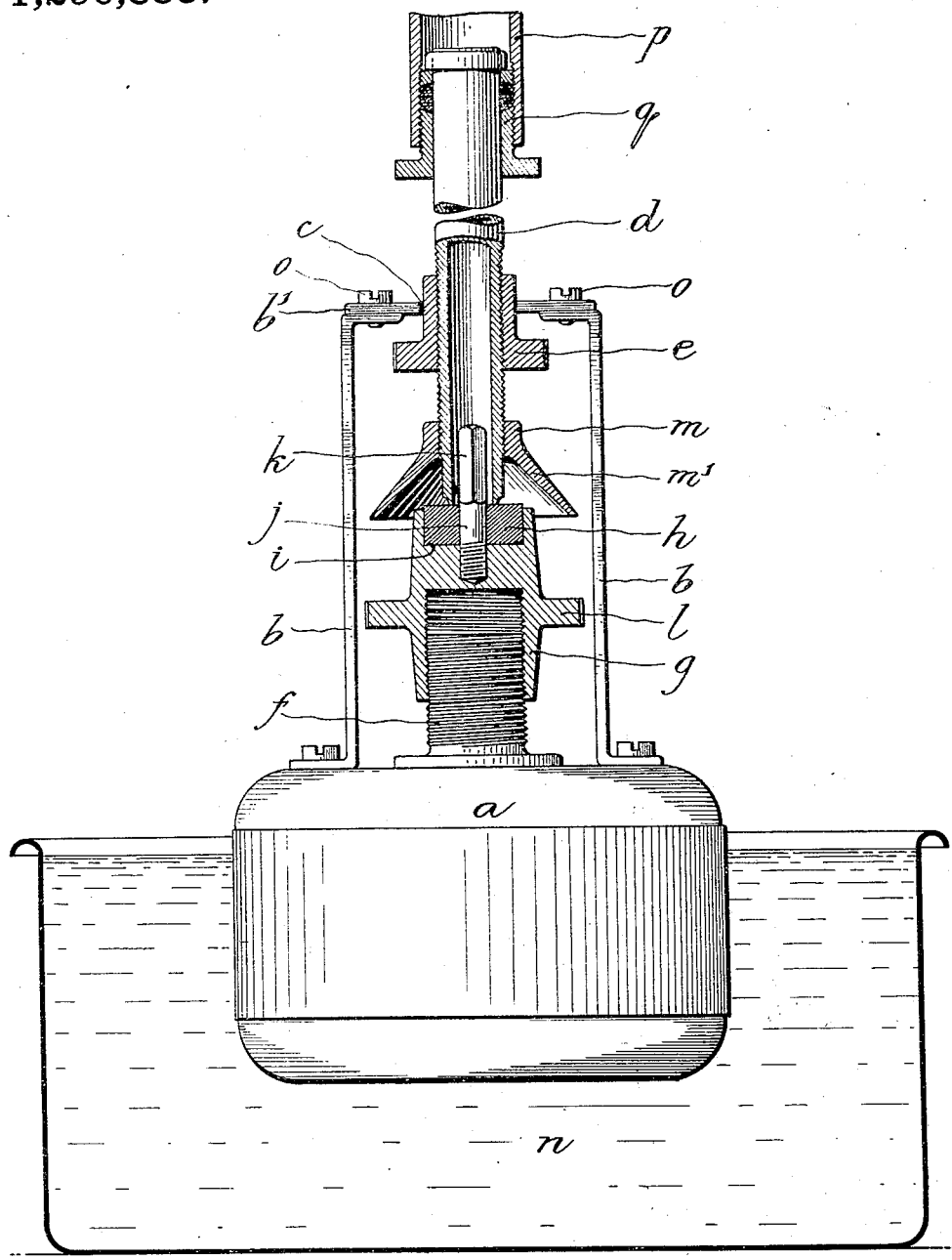

INVENTOR:
George T. Blanning
By John B. Seifert
His Atty.

UNITED STATES PATENT OFFICE.

GEORGE THOMAS BLANNING, OF BLACKTOWN, NEW SOUTH WALES, AUSTRALIA.

FLOAT-CONTROLLED VALVES.

1,290,883.   Specification of Letters Patent.   Patented Jan. 14, 1919.

Application filed August 21, 1917. Serial No. 187,355.

*To all whom it may concern:*

Be it known that I, GEORGE THOMAS BLANNING, a subject of the King of Great Britain, residing at "The Laurels," Blacktown, in the State of New South Wales, Commonwealth of Australia, have invented certain new and useful Improvements in and Connected with Float-Controlled Valves, of which the following is a specification.

This invention relates to improvements in and connected with float valves and it has been devised particularly in order to provide a simple and economically constructed device for attachment to water supply pipes whereby water can be kept without attention at a constant level in drinking troughs or reservoirs for poultry, stock or other animals.

The invention briefly comprises a valve which is adapted to control the flow of water from a supply pipe and is arranged in combination with a float having means for keeping the said valve in its closed position and for adjusting the parts to govern the flow or height of the water in the drinking trough or reservoir.

In order that the invention may be readily understood reference will now be had to the accompanying sheet of explanatory drawings wherein:—

Figure 1 is a view in front elevation, partly in section, of a float valve and connections.

In the drawing the letter $a$ designates a float of any approved size and shape to the top of which is secured a yoke $b$ which may be of flat bar metal. The center of the looped portion of the yoke $b$ is formed with a hole $c$ through which the end of a water supply pipe $d$ is adapted to pass freely. The supply pipe $d$ is cut or formed square at the end and is screwed externally to take a nut $e$ which is adjusted to regulate the movement of the float from the discharge end of the pipe.

The top of the float $a$ midway between the legs of the yoke is provided with a screwed boss or stud $f$ fitting into or over which is an adjustable member $g$ carrying a valve on its upper end. The valve comprises a ring $h$ of rubber, leather or other suitable material, which is placed in a recess $i$ surrounding a pin or stud $j$ projecting vertically from the said adjustable member.

The pin or stud $j$ on said adjustable member $g$ is adapted to pass upward into the discharge end of the water supply pipe $d$ and its sides can be flattened at $k$ to provide for a free flow of water from the pipe. The pin or stud $j$ prevents the float $a$ swinging sidewise and thereby insures the ring $h$ of the valve being retained in its correct position relatively with the discharge end of the water supply pipe.

A knurled flange $l$ is formed on the adjustable member $g$ to permit of it being freely operated to place the valve nearer to or farther from the top of the float.

A collar $m$ having downwardly flared flange $m^1$ is fitted to or screwed on the lower end of the water supply pipe $d$ to direct the water downward when it escapes from the said pipe.

In operation the adjustable member is set to permit of the float $a$ rising a desired height to maintain a required quantity of water in a drinking trough or other reservoir $n$ placed therebeneath. The adjustable member $g$ when screwed right down on the boss or stud $f$ will permit of a maximum flow of water from the supply pipe $d$ and when it is screwed upward it lessens the flow of water from the said pipe.

The nut $e$ on the supply pipe $d$ can be set to force the ring $h$ of the valve against the lower end of the supply pipe and thereby prevent the flow of water therefrom.

The amount of movement of the float $a$ is determined by setting the adjustable member $g$ on the float and the nut $e$ on the water pipe as required.

In order to permit of the float being removed conveniently the central part $b^1$ of the yoke $b$ can be made detachable by securing it to the leg portions by screws $o$ or the like means.

The lower or discharge end of the water supply pipe $d$ may be slidably fitted in a main supply pipe $p$ with the provision of a gland $q$ to prevent leakage at the point of connection. This construction permits of the float and its attached parts being raised to permit of the removal of the drinking trough or other vessel conveniently from beneath the same.

The invention is simple in construction, neat in design and in use will be found thoroughly efficient for the purpose for which it has been devised.

What I do claim is:—

1. A device of the class described, comprising a float, a screwed stud projecting vertically from the top of the float, an adjustable member having a screwed connection with the screwed stud, a pin projecting upward from the center of the adjustable member, a ring of resilient material fitting around the base of the pin, a water supply pipe arranged in alinement with the pin, a collar on the water supply pipe, a yoke fitted to the top of the float having a hole to receive the water supply pipe, and an adjustable nut on the water supply pipe for limiting the movement of the float.

2. A device of the class described comprising in combination, a float, a screwed stud projecting vertically from the top of the float, an adjustable member having a screwed connection with the stud, a pin projecting upward from the center of the adjustable member, a rubber ring fitting around the base of the pin, flat sides on the pin, a water supply pipe arranged in alinement with and having its discharge end fitting over the pin, a collar on the water supply pipe having a downwardly flared flange, a yoke fitted to the top of the float, a removable top piece on the yoke having a hole to receive the water supply pipe, and an adjustable nut on the water supply pipe for limiting the movement of the float.

3. In a device of the class described the combination of a float, a screw-threaded stud projecting vertically from the top of the float, an adjustable member having a screwed connection with the stud, a pin projecting upwardly from the center of the adjustable member, a recess in the top of the adjustable member around the base of the pin, and a washer fitting in the recess.

4. In a device of the class described, a float having a movable connection with a water supply pipe, an adjustable member fitted to the top of the float, a pin projecting vertically from the center of the adjustable member and into the discharge end of the water supply pipe, and a washer surrounding the base of the pin.

5. In a device of the class described, the combination of a float, a yoke on the top of the float, a removable top part on the yoke having a hole, a water supply pipe passing through the hole, a nut on the water supply pipe forming a stop for the float, a collar fitted adjustably on the water supply pipe having a downwardly flared flange, and a valve on the float beneath the discharge end of the water supply pipe.

6. The combination with a reservoir and a water supply pipe leading into the same, of a float in the reservoir connected with the supply pipe to have vertical sliding movement and arranged to be maintained in alinement with the supply pipe; a valve carried by the float to engage with and shut off the flow of water from the supply pipe when the water reaches a predetermined level in the reservoir; means to adjust the valve to maintain variable water levels in the reservoir; and means carried by the water supply pipe arranged to coöperate with means carried by the float to limit the downward movement of the float.

In testimony whereof I affix my signature in presence of two witnesses.

GEORGE THOMAS BLANNING.

Witnesses:
M. STARFIELD,
A. J. CALLINAN.

Copies of this patent may be obtained for five cents each, by addressing the "Commissioner of Patents, Washington, D. C."